United States Patent
Hattori (10) Patent No.: US 7,764,001 B2
(45) Date of Patent: Jul. 27, 2010

(54) ROTATING ELECTRIC MACHINE (75) Inventor: Hiroyuki Hattori, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 229 days.

(21) Appl. No.: 12/096,522

(22) PCT Filed: Dec. 8, 2006

(86) PCT No.: PCT/JP2006/325006

§ 371 (c)(1),
(2), (4) Date: Jun. 6, 2008

(87) PCT Pub. No.: WO2007/066829

PCT Pub. Date: Jun. 14, 2007

(65) Prior Publication Data

US 2009/0243423 A1 Oct. 1, 2009

(30) Foreign Application Priority Data

Dec. 9, 2005 (JP) ............................. 2005-356489

(51) Int. Cl.
*H02K 1/18* (2006.01)
(52) U.S. Cl. .................. 310/216.092; 310/216.094; 310/184; 310/179
(58) Field of Classification Search ............. 310/179, 310/184, 180, 216.092–216.095
See application file for complete search history.

(56) References Cited

U.S. PATENT DOCUMENTS 6,812,610 B2 * 11/2004 Kim et al. ................... 310/184

2004/0012292 A1 1/2004 Kometani et al.

FOREIGN PATENT DOCUMENTS

| JP | 53-129805 A | | 11/1978 |
|---|---|---|---|
| JP | 54-23915 A | | 2/1979 |
| JP | 4-285444 A | | 10/1992 |
| JP | 6-113512 A | | 4/1994 |
| JP | 8-65973 A | | 3/1996 |
| JP | 11-18326 A | | 1/1999 |
| JP | 11018326 | * | 1/1999 |
| JP | 2003-348781 A | | 12/2003 |

* cited by examiner

*Primary Examiner*—Quyen Leung
*Assistant Examiner*—Leda Pham
(74) *Attorney, Agent, or Firm*—Sughrue Mion, PLLC (57) ABSTRACT

In a rotating electric machine that is formed of a distribution winding motor with two slots per each pole and each phase, a stator core includes an air gap of a constant width dg1 between the leading end of a same-phase-intermediate tooth and the outer circumferential face of a rotor core, and an air gap of a width not uniform in the circumferential direction between the leading end of a different-phase-intermediate tooth and the outer circumferential face of the rotor core, with a width dg2 (>dg1) as the largest value. A magnetic circuit having a magnetic resistance higher than that of the same-phase-intermediate tooth is formed at the different-phase-intermediate tooth. By establishing a difference in the width of the air gap such that the number of flux linkages at the different-phase-intermediate tooth reduced by the increased magnetic resistance is substantially equal to the number of flux linkages at the same-phase-intermediate tooth, the electromagnetic excitation applied in directions opposite to each other acquire balance so as to cancel each other, allowing vibration at the stator core to be suppressed.

12 Claims, 8 Drawing Sheets

ROTATING ELECTRIC MACHINE

CROSS REFERENCE TO RELATED APPLICATIONS

This application is a National Stage of International Application No. PCT/JP2006/325006 filed on Dec. 8, 2006, claiming priority based on Japanese Patent Application No. 2005-356489, filed Dec. 9, 2005, the contents of all of which are incorporated herein by reference in their entirety.

TECHNICAL FIELD

The present invention relates to rotating electric machines, particularly a rotating electric machine allowing reduction in electromagnetic noise.

BACKGROUND ART

Recently, attention is focused on hybrid vehicles and electric vehicles as vehicles taking into account environmental issues. A hybrid vehicle includes, in addition to a conventional engine, a direct current power source, an inverter, and a rotating electric machine (motor) driven by the inverter as the power source. In addition to achieving the power source by driving the engine, the direct current voltage from the direct current power source is converted into alternating voltage by the inverter, and the converted alternating voltage is used to rotate the motor to achieve power.

An electric vehicle includes a direct current power source, an inverter, and a motor driven by the inverter as the power source.

In such a hybrid vehicle or electric vehicle, the motor is driven in a relatively wide range of rotation from low speed to high speed. There was a problem that the electromagnetic noise generated during driving will become so great that the rider in the vehicle will be disturbed by the noise. Particularly, the electromagnetic noise of harmonics in the range from an idling state where the engine rotational speed is low to the cruising region is humanly audible as annoying noise, differing in frequency from the ground noise caused by the engine and auxiliary machine.

Recently, it has become apparent that this electromagnetic noise of harmonics is greatly affected by the electromagnetic excitation of 6f generated during motor operation. This "6f" implies six times the basic frequency f of the alternating current supplied to the motor.

Japanese Patent Laying-Open No. 2003-348781 discloses a method of reducing such 6f electromagnetic excitation of the motor. There is provided an AC rotating electric machine for a vehicle formed of a stator including a stator iron core (stator core) having two slots per each pole and each phase, and a 3-phase stator coil wound around the stator core, and a rotor provided rotatable at the inner side of the stator, wherein first and second stator coils are connected in series, each having the X-phase coil, Y-phase coil and Z-phase coil constituting the aforementioned 3-phase stator coil wound at adjacent slot groups, and the slots are formed at an irregular pitch of alternate electrical angles of $\alpha°$ and $(60-\alpha)°$ ($\alpha \neq 30°$).

According to this configuration, the 6f electromagnetic excitation that was an issue in a conventional rotating electric machine having two slots formed per each pole and each phase at an equal pitch of the electrical angle of 30° can be reduced by optimizing $\alpha°$. As a result, the electromagnetic noise and vibration caused by the 6f electromagnetic excitation are reduced.

However, the AC rotating electric machine for a vehicle disclosed in Japanese Patent Laying-Open No. 2003-348781 encounters the problem that the 6f electromagnetic excitation cannot be reliably reduced due to the uneven magnetic flux generated at the stator iron core among the plurality of stator teeth in response to the supply of the alternating current to the wound 3-phase stator coil.

Namely, in the AC rotating electric machine of Japanese Patent Laying-Open No. 2003-348781, each of the 3-phase stator coil has series-connected first and second stator coils wound at adjacent slot groups. Specifically, when there are 96 magnetic poles in the rotor, the fourth, tenth, sixteenth, . . . ninety-fourth slots constitute the first slot group, whereas the fifth, eleventh, seventeenth, . . . ninety-fifth slots constitute the second slot group. The first slot group and the second slot group receive the X-phase coil.

Therefore, there is an imbalance in the number of windings of the stator coil between the stator teeth corresponding to the first slot group, having the first stator coil wound, and the stator teeth corresponding to the second slot group, having the second stator coil wound. The electromagnetic excitation applied to the teeth by supply of the alternating current to the stator coil will be out of balance between the teeth. This electromagnetic excitation is divided into a component that causes the stator core to vibrate in the radial direction and a component that causes the stator core to vibrate in the circumferential direction. The radial vibration occurring at the stator core due to the imbalance of the component in the radial direction causes the air in contact with the outer circumferential face or inner circumferential face of the stator core to vibrate, leading to the generation of a large electromagnetic noise.

The present invention is directed to solve such a problem. An object of the present invention is to provide a rotating electric machine that suppresses stator vibration to allow reduction in electromagnetic noise.

DISCLOSURE OF THE INVENTION

According to the present invention, a rotating electric machine of s (s is plural) phases includes a rotor having n (n is a natural number) magnetic poles, and a stator. The stator includes a stator core having 2n×s teeth corresponding to two times the s phases for each of the n magnetic poles and 2n×s slots each formed between adjacent teeth, and n×s coils wound around the 2n×s teeth. The n×s coils constitute a coil group wound in a manner shifted by just one slot per phase for each of the n magnetic poles. The 2n×s teeth include a same-phase-intermediate tooth having coils of the same phase inserted in two slots formed at both sides in the direction of a rotational shaft of the rotor, and a different-phase-intermediate tooth having coils of different phases inserted in two slots formed at both sides in the direction of the rotational shaft of the rotor. The rotating electric machine further includes magnetic resistance adjusting means for providing a difference in the magnetic resistance of a magnetic circuit formed for each of the same-phase-intermediate tooth and different-phase-intermediate tooth when alternating current is supplied to the n×s coils such that the number of flux linkages passing through acquires balance with each other.

As compared to the conventional case where the applied electromagnetic excitation was out of balance between the same-phase-intermediate tooth and different-phase-intermediate tooth due to the difference in the number of flux linkages passing through caused by the equal magnetic resistance of the magnetic circuits, the rotating electric machine set forth above is advantageous in that the electromagnetic excitation of the same-phase-intermediate tooth and the electromagnetic excitation of the different-phase-intermediate tooth applied in opposite directions along the radial direction are equalized by virtue of the balance in the number of flux linkages between the same-phase-intermediate tooth and different-phase-intermediate tooth as a result of providing a difference in the magnetic resistance therebetween. Accordingly, the electromagnetic excitation of the same-phase-intermediate tooth and the electromagnetic excitation of the different-phase-intermediate tooth cancel each other, such that the electromagnetic excitation applied to the stator in entirety will become substantially zero. As a result, the stator vibration is suppressed, allowing reduction in the electromagnetic noise.

Preferably, the magnetic resistance adjusting means includes setting the magnetic resistance of the magnetic circuit formed at the different-phase-intermediate tooth larger than the magnetic resistance of the magnetic circuit formed at the same-phase-intermediate tooth.

By acquiring balance between the number of flux linkages of the different-phase-intermediate tooth reduced as a result of the increased magnetic resistance and the number of flux linkages of the same-phase-intermediate tooth in the rotating electric machine of the present aspect, the electromagnetic excitation applied thereto is equalized.

Preferably, the magnetic resistance adjusting means includes setting the width of the air gap formed between the leading end of the different-phase-intermediate tooth and the outer circumferential face of the rotor larger than the width of the air gap formed between the leading end of the same-phase-intermediate tooth and the outer circumferential face of the rotor.

By increasing the magnetic resistance of the air gap portion in the rotating electric machine, the magnetic resistance of the magnetic circuit formed at the different-phase-intermediate tooth becomes larger than the magnetic resistance of the magnetic circuit formed at the same-phase-intermediate tooth. Accordingly, by acquiring balance between the number of flux linkages of the different-phase-intermediate tooth reduced as a result of the increased magnetic resistance and the number of flux linkages of the same-phase-intermediate tooth, the electromagnetic excitation applied thereto is equalized.

Preferably, the magnetic resistance adjusting means includes setting the width of the air gap formed between the leading end of the same-phase-intermediate tooth and the outer circumferential face of the rotor continuous with the width of the air gap formed between the leading end of the different-phase-intermediate tooth and the outer circumferential face of the rotor at end portions of a slot opening.

The rotating electric machine set forth above is advantageous in that design modification in the fabrication step of the stator is not required since the configuration of the end portions of the slot opening is kept similar to those of the conventional rotating electric machine.

Preferably, the magnetic resistance adjusting means includes setting the cross sectional area of the magnetic path of the different-phase-intermediate tooth smaller than the cross sectional area of the magnetic path of the same-phase-intermediate tooth.

By increasing the magnetic resistance of the tooth portion in the rotating electric machine, the magnetic resistance of the magnetic circuit formed at the different-phase-intermediate tooth becomes larger than the magnetic resistance of the magnetic circuit formed at the same-phase-intermediate tooth. Accordingly, by acquiring balance between the number of flux linkages of the different-phase-intermediate tooth reduced as a result of the increased magnetic resistance and the number of flux linkages of the same-phase-intermediate tooth, the electromagnetic excitation applied thereto is equalized.

By acquiring balance in the number of flux linkages between the same-phase-intermediate tooth and different-phase-intermediate tooth in the present invention, the electromagnetic excitation of the same-phase-intermediate tooth and the electromagnetic excitation of the different-phase-intermediate tooth applied in directions opposite to each other along the radial direction are equalized. Since the electromagnetic excitation of the same-phase-intermediate tooth and the electromagnetic excitation of the different-phase-intermediate tooth cancel each other, the electromagnetic excitation applied to the stator in entirety is substantially zero. As a result, stator vibration is suppressed, allowing reduction in the electromagnetic noise.

BEST MODES FOR CARRYING OUT THE INVENTION

Embodiments of the present invention will be described in detail hereinafter with reference to the drawings. In the drawings, the same reference characters designate the same or corresponding elements.

FIRST EMBODIMENT

Figure 1:
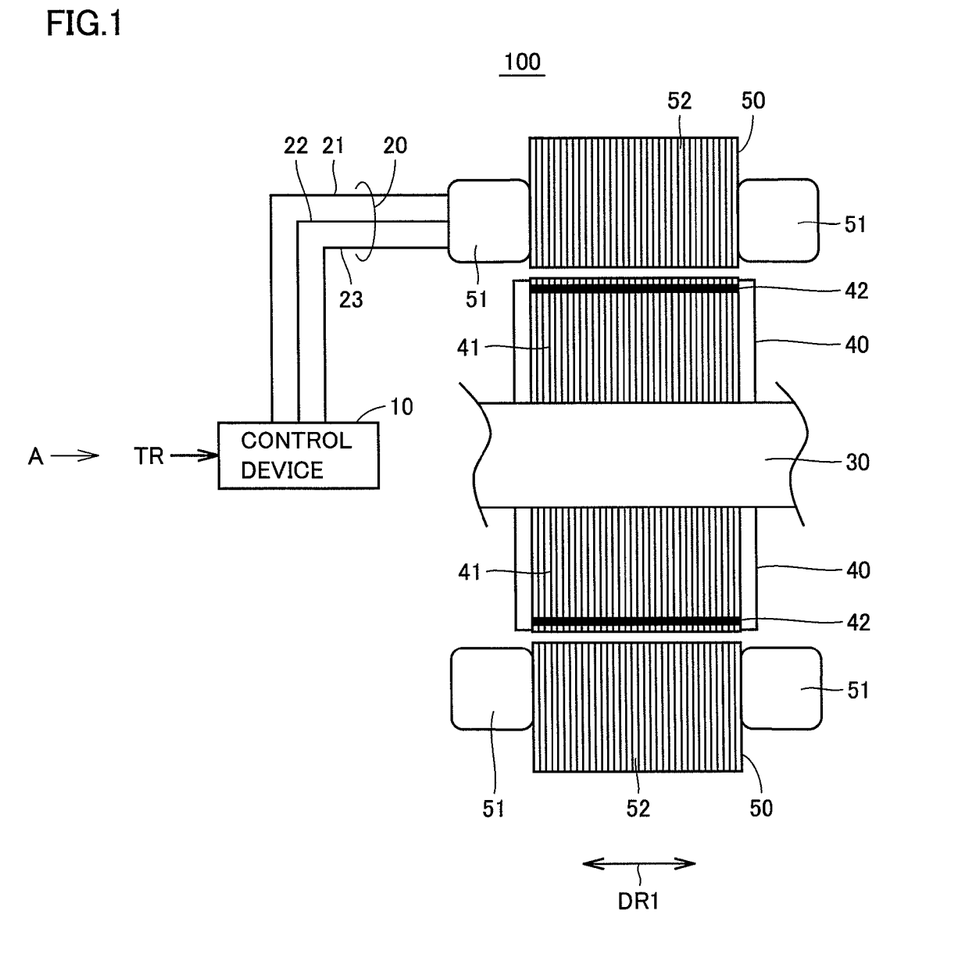
FIG. 1 is a sectional view of a rotating electric machine according to a first embodiment of the present invention.

FIG. 1 is a sectional view of a rotating electric machine according to a first embodiment of the present invention.

Referring to FIG. 1, a rotating electric machine 100 of the present invention includes a control device 10, a 3-phase cable 20, a shaft 30, a rotor 40, and a stator 50.

Rotor 40 includes a rotor core 41 and a magnet 42. Stator 50 includes a stator coil 51, and a stator core 52.

Control device 10 receives a torque control value TR to be output by rotating electric machine 100 from an ECU (Electrical Control Unit) provided external to rotating electric machine 100 to generate a motor control current MCTLI for providing torque according to the receive torque control value TR, and provides the generated motor control current MCTLI to stator coil 51 of stator 50 via 3-phase cable 20.

3-phase cable 20 connects control device 10 and stator coil 51. 3-phase cable 20 includes a U-phase cable 21, a V-phase cable 22, and a W-phase cable 23. Shaft 30 is inserted into rotor core 41 of rotor 40 from a rotational shaft direction DR1 and coupled with rotor core 41. Rotor core 41 is formed of a plurality of electromagnetic steel plates stacked in rotational shaft direction DR1. Magnet 42 is inserted into rotor core 41 from rotational shaft direction DR1.

Stator core 52 of stator 50 is configured having a plurality of electromagnetic steel plates stacked in rotational shaft direction DR1. Stator coil 51 is wound around stator core 52. Stator coil 51 is formed of a U-phase coil group, a V-phase coil group, and a W-phase coil group whose terminals are connected to 3-phase cable 20.

Figure 2:
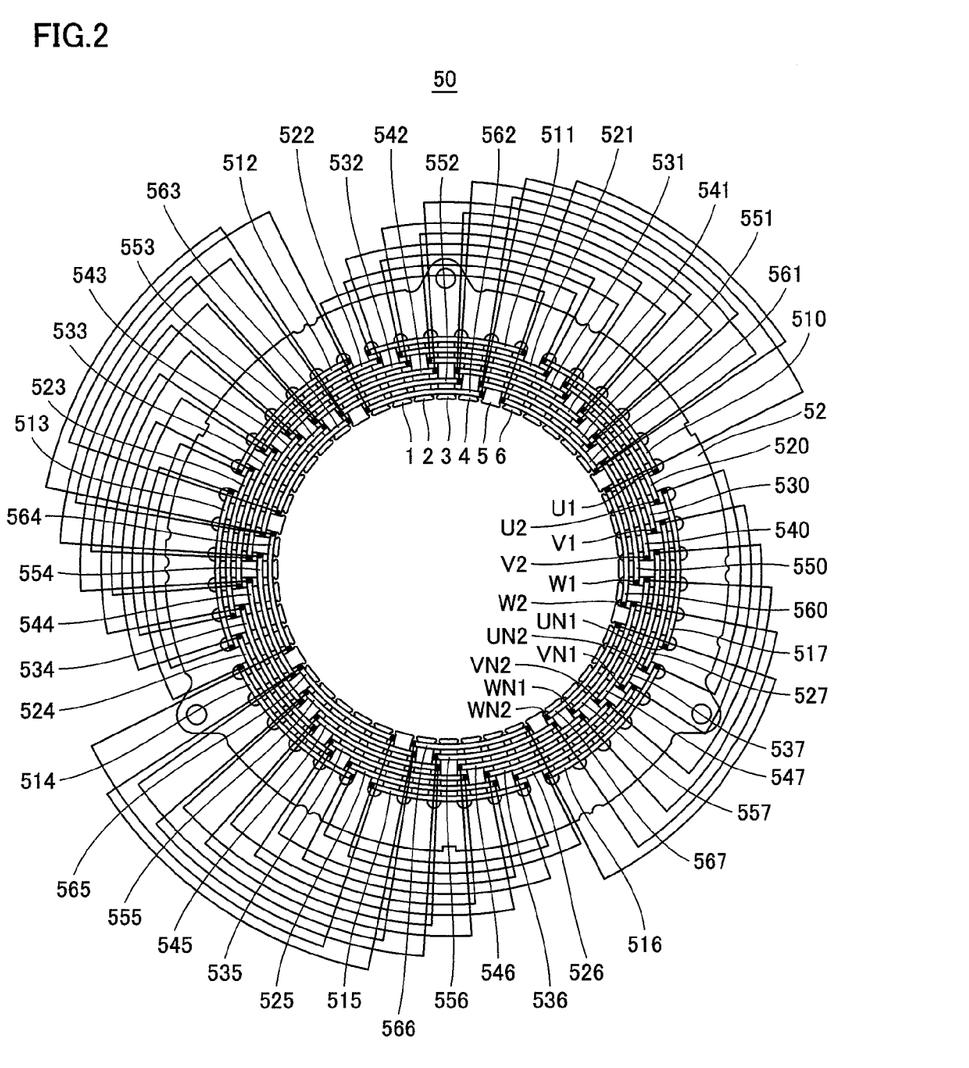
FIG. 2 is a plan view of a stator viewed from direction A in FIG. 1.

FIG. 2 is a plan view of stator 50 viewed from a direction A in FIG. 1.

Referring to FIG. 2, stator core 52 takes a hollow cylindrical shape, including 48 teeth 1 aligned in the inner circumferential direction. At stator core 52, a coil is received at two slots apart from each other by 6 slots corresponding to one magnetic pole pitch. The coil received at respective two slots apart from each other by 6 slots is connected in series to constitute a unit coil corresponding to one complete turn around stator core 52. A total of six such unit coils is wound around stator core 52, having the slot in which the coil is received shifted respectively by just one slot, to constitute stator coil 51. Each of the U-phase coil group, V-phase coil group and W-phase coil group is formed of two unit coils, shifted respectively by just one slot.

In detail, coils 510-517 constitute the first U-phase coil, and coils 520-527 constitute the second U-phase coil. Coils 510-517 are arranged at the outermost circumferential side. Coils 520-527 are located at the inner side of coils 510-517, and shifted by just one slot in the circumferential direction with respect to coils 510-517. Coils 510-517 and coils 520-527 constitute the U-phase coil group.

Coils 530-537 constitute the first V-phase coil, and coils 540-547 constitute the second V-phase coil. Coils 530-537 are arranged at the inner side of coils 520-527, and shifted by just one slot in the circumferential direction with respect to coils 520-527. Coils 540-547 are arranged at the inner side of coils 530-537, and shifted by just one slot in the circumferential direction with respect to coils 530-537. Coils 530-537 and coils 540-547 constitute the V-phase coil group.

Coils 550-557 constitute the first W-phase coil, and coils 560-567 constitute the second W-phase coil. Coils 550-557 are arranged at the inner side of coils 540-547, and shifted by just one slot in the circumferential direction with respect to coils 540-547. Coils 560-567 are arranged at the inner side of coils 550-557, and shifted by just one slot in the circumferential direction with respect to coils 550-557. Coils 550-557 and coils 560-567 constitute the W-phase coil group.

Each of coils 510-517, 520-527, 530-537, 540-547, 550-557, and 560-567 is wound in series at each of a corresponding plurality of teeth. For example, coil 510 is wound a predetermined number of times from the outer circumferential side at five continuous teeth in entirety. Each of the remaining coils is wound at corresponding five teeth in a manner similar to coil 510.

Coils 510-517 are connected in series, including a terminal U1 as one end and a neutral point UN1 as the other end. Coils 520-527 are connected in series, including a terminal U2 as one end and a neutral point UN2 as the other end.

Coils 530-537 are connected in series, including a terminal V1 as one end and a neutral point VN1 as the other end. Coils 540-547 are connected in series, including a terminal V2 as one end and a neutral point VN2 as the other end.

Coils 550-557 are connected in series, including a terminal W1 as one end and a neutral point WN1 as the other end. Coils 560-567 are connected in series, including a terminal W2 as one end and a neutral point WN2 as the other end.

Neutral points UN1, UN2, VN1, VN2, WN1 and WN2 are common-connected at one point. Terminals U1 and U2 are connected to U-phase cable 21 of 3-phase cable 20. Terminals V1 and V2 are connected to V-phase cable 22 of 3-phase cable 20. Terminals W1 and W2 are connected to W-phase cable 23 of 3-phase cable 20.

Figure 3:
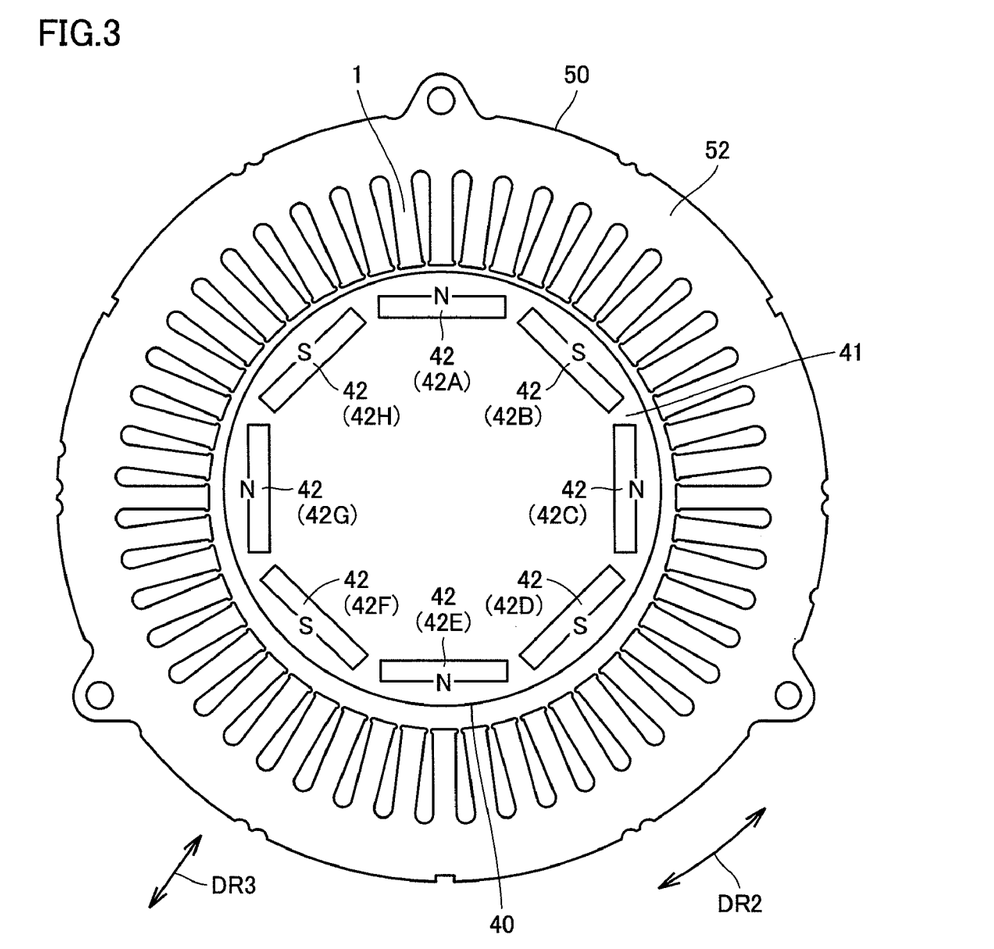
FIG. 3 is a plan view of the rotor and stator viewed from direction A in FIG. 1.

FIG. 3 is a plan view of rotor 40 and stator 50 viewed from direction A in FIG. 1.

Referring to FIG. 3, rotor 40 is arranged at the inner circumferential side of stator 50. Eight magnets 42 are arranged along a circumferential direction DR2. Magnets 42A, 42C, 42E and 42G are arranged such that the outer circumferential side of rotor core 41 serves as the N pole. Magnets 42B, 42D, 42F and 42H are arranged such that the outer circumferential side of rotor core 41 serves as the S pole. The eight magnets 42 (42A-42H) are magnetized in the radial direction of rotor 40, and arranged along circumferential direction DR2 such as that the polarity of a magnet is inverted between adjacent magnets. Coils 510-517, 520-527, 530-537, 540-547, 550-557 and 560-567 of FIG. 2 are arranged corresponding to eight magnets 42 (42A-42H).

Stator core 52 includes forty-eight teeth 1. The number of teeth 1 is defined to be 6 times (integer multiple) of the number of magnetic poles of magnets 42 (42A-42H) in rotor 40.

Figure 4:
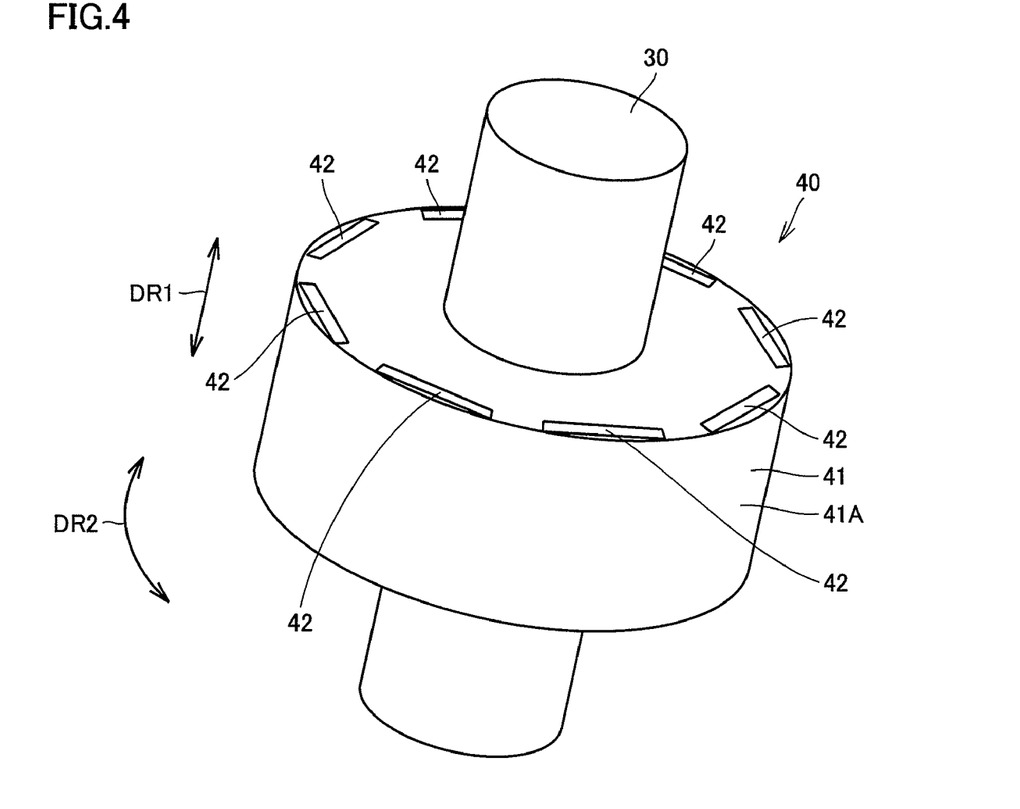
FIG. 4 is a perspective view of the rotor in FIG. 1.

FIG. 4 is a perspective view of rotor 40 in FIG. 1.

Referring to FIG. 4, rotor core 41 of rotor 40 takes a shape of substantially a cylinder, and includes a cylindrical face 41A. Magnet 42 is embedded in rotor core 41 from rotational shaft direction DR1.

A rotating electric machine including a stator core 52 with two slots provided per each pole and phase and a stator coil 51 formed of a connection of first and second coils of each phase wound at slots shifted by just one slot is generally referred to as "a distribution winding motor with two slots per pole and phase".

Referring to FIG. 2 again, the forty-eight teeth 1 arranged in the circumferential direction in stator core 52 is classified into a tooth having coils of the same phase received in two slots located at both sides (hereinafter, also referred to as same-phase-intermediate tooth) and a tooth having coils of different phases received in two slots located at both sides (hereinafter, also referred to as different-phase-intermediate tooth).

Specifically, in view of one magnetic pole in FIG. 2, a tooth 1 among six teeth 1-6 arranged continuously in the circumferential direction corresponds to the same-phase-intermediate tooth since U-phase coils 511 and 521 are received at the slots located at both sides. Similarly, tooth 3 corresponds to the same-phase-intermediate tooth since it is sandwiched between two slots in which V-phase coils 531 and 541 are received. Further, tooth 5 corresponds to the same-phase-intermediate tooth since it is sandwiched between two slots in which W-phase coils 551 and 561 are received.

In contrast, tooth 2 corresponds to a different-phase-intermediate tooth since U-phase coil 521 and V-phase coil 531 are received at the slots located at both sides. Similarly, tooth 4 corresponds to a different-phase-intermediate tooth since V-phase coil 541 and W-phase coil 551 are received at the slots located at both sides. Furthermore, tooth 6 corresponds to a different-phase-intermediate tooth since W-phase coil 561 and U-phase coil 510 are received at the slots located at both sides.

Thus, the distribution winding motor with two slots per pole and phase of FIG. 2 has the same-phase-intermediate tooth and different-phase-intermediate tooth arranged alternately along the circumferential direction at stator core 52. When motor control current MLTI identified as alternating current is supplied to stator coil 51, magnetic flux is generated in stator core 52. The generated magnetic flux passes through the same-phase-intermediate tooth (for example, teeth 1, 3 and 5) and different-phase-intermediate tooth (for example, teeth 2, 4 and 6) to flow into rotor 40 via the air gap located between the inner circumferential face of stator core 52 and the outer circumferential face of the rotor core (not shown).

Figure 5:
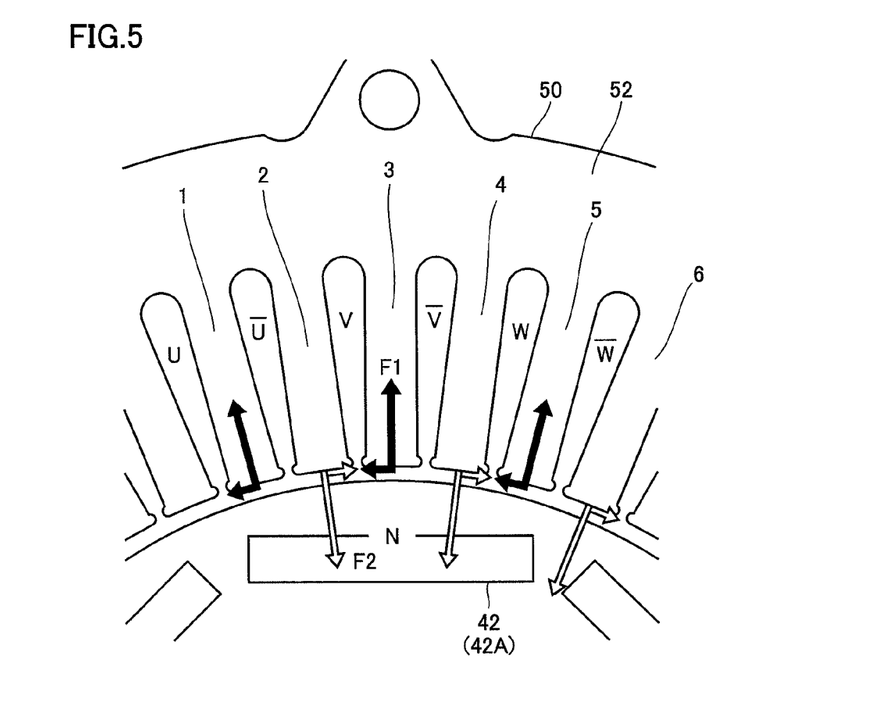
FIG. 5 is a diagram to describe the electromagnetic excitation at engine order 24 applied to the teeth.

At this stage, electromagnetic excitation as shown in FIG. 5 is generated at each of the same-phase-intermediate tooth and different-phase-intermediate tooth. This electromagnetic excitation is the force applied to teeth 1 to cause vibration at teeth 1 as a result of alternating current supplied to stator coil 51 of stator 50.

FIG. 5 is a diagram to describe the electromagnetic excitation applied to teeth 1.

Referring to FIG. 5, electromagnetic excitation having an engine order that is an integer multiple of 4 is generated at rotating electric machine 100 since rotor 40 includes eight magnets 42, forming four pairs of NS poles. Namely, electromagnetic excitation having the engine order of 4, 8, 12, 16, 20, 24, . . . is generated. It is known that the electromagnetic excitation of 24th order (hereinafter, also referred to as electromagnetic excitation at engine order 24) corresponding to the electromagnetic excitation of 6f (f: basic frequency of motor control current MTLI) among the aforementioned order has an extremely greatest influence on the motor electromagnetic noise and vibration.

The electromagnetic excitation at engine order 24 has a component applied to each one of teeth 1, 2, 3, 4, 5, . . . , as shown in FIG. 5. The electromagnetic excitation at each one teeth 1 is applied concentrated at the leading end of teeth 1.

Moreover, the electromagnetic excitation applied to each of teeth 1, 2, 3, 4, 5, 6, . . . is opposite in direction between adjacent teeth. Specifically, electromagnetic excitation F1 applied to each of teeth 1, 3 and 5 is represented by a radial component in the outward direction and a circumferential component along one direction, as indicated by the solid arrows in the drawing. In contrast, electromagnetic excitation F2 applied to each of teeth 2, 4 and 6 is represented by a radial component in the inward direction and a circumferential component along the other direction, as indicated by the open arrows in the drawing. Therefore, the same-phase-intermediate teeth 1, 3, 5, . . . and different-phase-intermediate teeth 2, 4, 6, . . . arranged alternately in the circumferential direction will be applied with electromagnetic excitation opposite in direction to each other.

Thus, the electromagnetic excitation is represented by a component applied in the radial direction and a component applied in the circumferential direction at the leading end of teeth 1, wherein the component in the radial direction is relatively larger than the component in the circumferential direction. Namely, composite vibration of vibration in the radial direction and vibration in the circumferential direction is induced at the motor by the electromagnetic excitation at engine order 24. Vibration in the radial direction governs the motor vibration attributable to generation of electromagnetic noise. Attention is focused on the electromagnetic excitation applied in the radial direction at the leading end region of teeth 1 from the standpoint of reducing electromagnetic noise in the present invention.

The electromagnetic excitation per se applied to each of teeth 1 exhibits transition in size and direction over time according to motor control current MTLI that is the alternating current. The relationship of the electromagnetic excitation exerted in opposite directions to each other between adjacent teeth is always retained.

Figure 6:
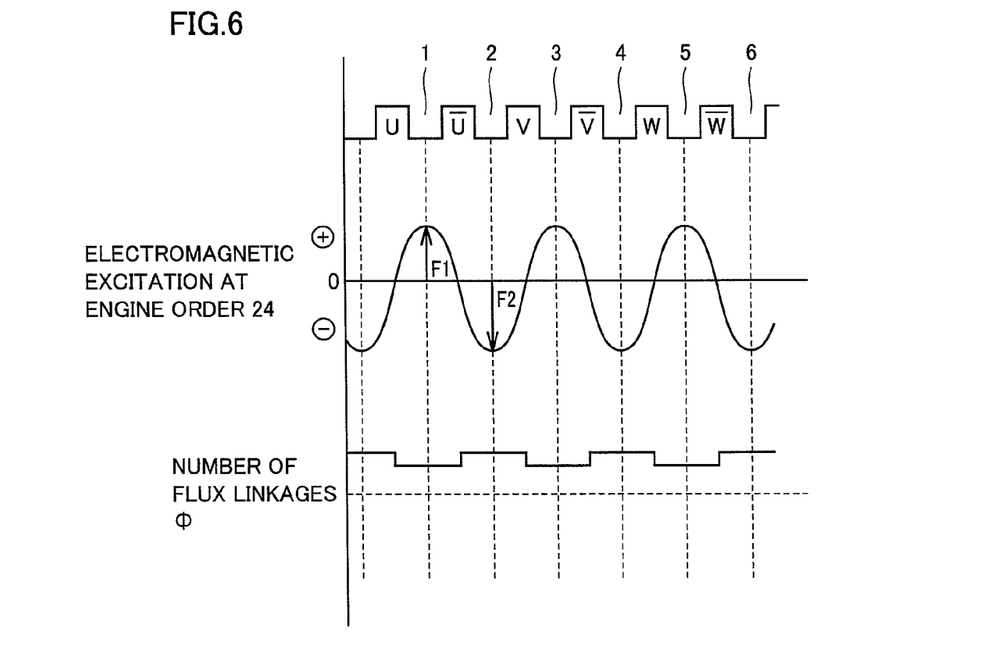
FIG. 6 represents the relationship between the stator core teeth and the electromagnetic excitation.

FIG. 6 represents the relationship between teeth 1, 2, 3, 4, 5, 6, . . . of stator core 52 and the electromagnetic excitation at engine order 24. In FIG. 6, the teeth are represented by a deployment view.

Referring to FIG. 6, the electromagnetic excitation at engine order 24 includes the application of electromagnetic excitation F1 in the plus direction to same-phase-intermediate teeth 1, 3 and 5, and electromagnetic excitation F2 in the minus direction to different-phase-intermediate teeth 2, 4 and 6. With regards to the component in the circumferential direction of the electromagnetic excitation applied to each one of teeth 1, the influence to electromagnetic noise is small, as set forth above. Therefore, illustration and description thereof will not be presented here.

There will be a difference in the level of electromagnetic excitation applied to same-phase-intermediate teeth 1, 3 and 5 and different-phase-intermediate teeth 2, 4 and 6. Namely, the relationship is established of the electromagnetic excitation applied to different-phase-intermediate teeth 2, 4 and 6 being larger than the electromagnetic excitation applied to same-phase-intermediate teeth 1, 3, and 5. Therefore, there will be an imbalance in the electromagnetic excitation applied in opposite directions between adjacent teeth 1 at stator core 52. The component corresponding to the difference in electromagnetic excitation therebetween will act in the radial direction to stator core 52 in entirety. As a result, stator core 52 will vibrate in the radial direction to cause generation of electromagnetic noise.

Difference in the number of flux linkages Φ passing through the teeth between the same-phase-intermediate tooth and different-phase-intermediate tooth can be cited as one factor of causing a difference in the level between the electromagnetic excitation of the same-phase-intermediate tooth and the electromagnetic excitation of the different-phase-intermediate tooth. If the number of flux linkages Φ passing through the same-phase-intermediate tooth can be set equal to the number of flux linkages passing through the different-phase-intermediate tooth, the level of the electromagnetic excitation applied can be rendered equal to each other, eliminating any difference therebetween. Electromagnetic excitation equal to each other will cancel the electromagnetic excitation applied in opposite directions between the same-phase-intermediate tooth and different-phase-intermediate tooth, so that the electromagnetic excitation at engine order 24 applied to stator core 52 in entirety can be made substantially zero. As a result, vibration of stator core 52 can be suppressed.

As one method of equalizing the number of flux linkages passing through the same-phase-intermediate tooth and different-phase-intermediate tooth, rotating electric machine 100 of the present embodiment is configured to establish a difference between the same-phase-intermediate tooth and different-phase-intermediate tooth in the magnetic resistance of the magnetic circuit formed for each teeth. In consideration of the magnetomotive force fixed to a predetermined value based on motor control current MTLI and the number of windings of stator coil 51, the number of flux linkages is to be set equal by providing a difference in the magnetic resistance between the two teeth.

In detail, the magnetic resistance in a magnetic circuit formed by motor control current MTLI is represented by the sum of the magnetic resistance at the teeth region and the magnetic resistance at the air gap region. It is well known that the magnetic resistance is represented by "magnetic resistance=average magnetic path length/(permeability× cross sectional area of magnetic path)". In the present embodiment, a difference in the magnetic resistance is established by differentiating the width of the air gap (corresponding to the aforementioned average magnetic path length) between the same-phase-intermediate tooth and different-phase-intermediate tooth, as will be described hereinafter.

In the present embodiment, the configuration of differentiating the air gap width between the same-phase-intermediate tooth and different-phase-intermediate tooth is implemented by "magnetic resistance adjusting means".

Figure 7:
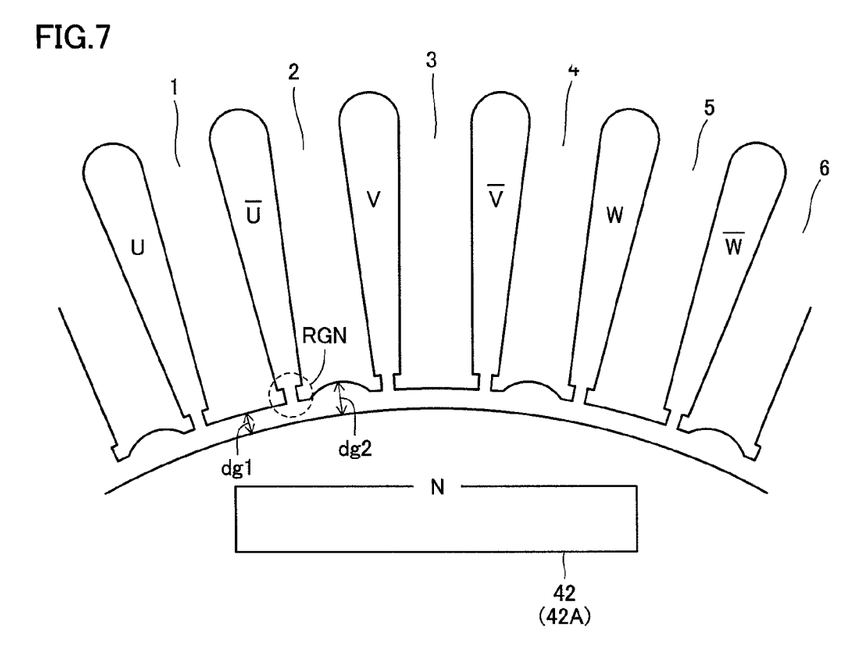
FIG. 7 is a diagram to describe the stator core according to the first embodiment of the present invention.
Figure 8:
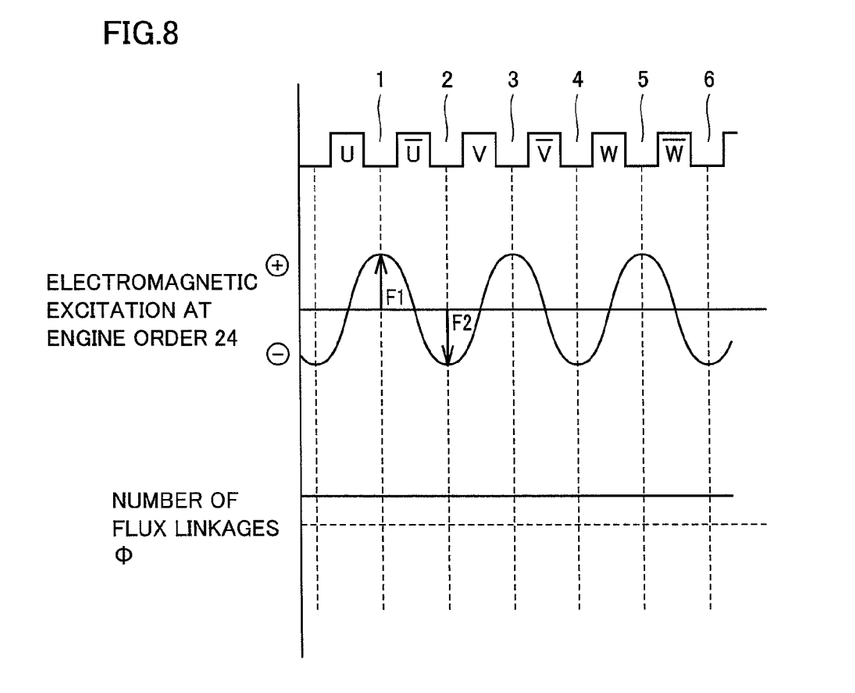
FIG. 8 is a diagram to describe the electromagnetic excitation at engine order 24 applied to the teeth of the rotating electric machine according to the first embodiment of the present invention.

FIG. 7 is a diagram to describe stator core 52 according to the first embodiment of the present invention.

Referring to FIG. 7, stator core 52 includes an air gap between the leading end of same-phase-intermediate tooth 1 (or 3, 5) and the outer circumferential face of rotor core 41 set so that the width (corresponding to arrow dg1 in the drawing) is substantially uniform in the circumferential direction.

In addition, stator core 52 has an air gap between the leading end of different-phase-intermediate tooth 2 (or 4, 6) and the outer circumferential face of rotor core 41 set so that the width is not uniform in the circumferential direction.

Specifically, different-phase-intermediate tooth 2 has an arc-like recess formed at the leading end to be concave facing the outward side in the radial direction. This recess is formed avoiding the end portions of the slot opening (corresponding to region RGN in the drawing) formed between same-phase-intermediate tooth 1 and 3 located at both sides. In other words, the arc is located substantially at the center of the leading end region of teeth 2, excluding either end region in the circumferential direction. The width of the air gap at the most concave region is set to a width dg2 larger than the aforementioned width dg1.

By such a configuration, there is a difference in the magnetic resistance at the air gap between same-phase-intermediate tooth 1 and different-phase-intermediate tooth 2. In view of the magnetic resistance at the air gap being in proportion to the width thereof, different-phase-intermediate tooth 2 has a higher magnetic resistance at the air gap due to the relatively larger air gap width, as compared to that of same-phase-intermediate tooth 1. By increasing the magnetic resistance at the air gap region, the magnetic resistance of the magnetic circuit at different-phase-intermediate tooth 2 becomes higher than the magnetic resistance of the magnetic circuit at same-phase-intermediate tooth 1.

At different-phase-intermediate tooth 2, the number of flux linkages passing through is reduced by the increased magnetic resistance. This reduction in magnetic flux will cause a lower electromagnetic excitation to be applied to different-phase-intermediate tooth 2. By providing a difference in the air gap width such that the number of flux linkages of different-phase-intermediate tooth 2 after reduction is substantially equal to the number of flux linkages of same-phase-intermediate tooth 1, the electromagnetic excitation applied to different-phase-intermediate tooth 2 and the electromagnetic excitation applied to same-phase-intermediate tooth 1 become equal to each other in level. Accordingly, electromagnetic excitation F1 and electromagnetic excitation F2 applied in directions opposite to each other cancel each other, so that the electromagnetic excitation at engine order 24 applied to stator core 52 in entirety is substantially zero. As a result, vibration at stator core 52 is suppressed, allowing reduction in the electromagnetic noise of rotating electric machine 100.

By providing the recess of different-phase-intermediate tooth 2 such that the air gap width at the end portions of the slot opening is continuous between adjacent same-phase-intermediate teeth 1 and 3, as set forth above with reference to FIG. 7, design modification in the fabrication step of stator 50 is not required. For example, an electrical insulation member such as insulating paper is generally inserted at end portions of the slot opening to ensure electrical insulation between stator coil 51 and teeth 1. By the present invention, the design for the insulating paper does not have to be modified since the configuration of the slot opening end portions is maintained as in the conventional case.

Figure 9:
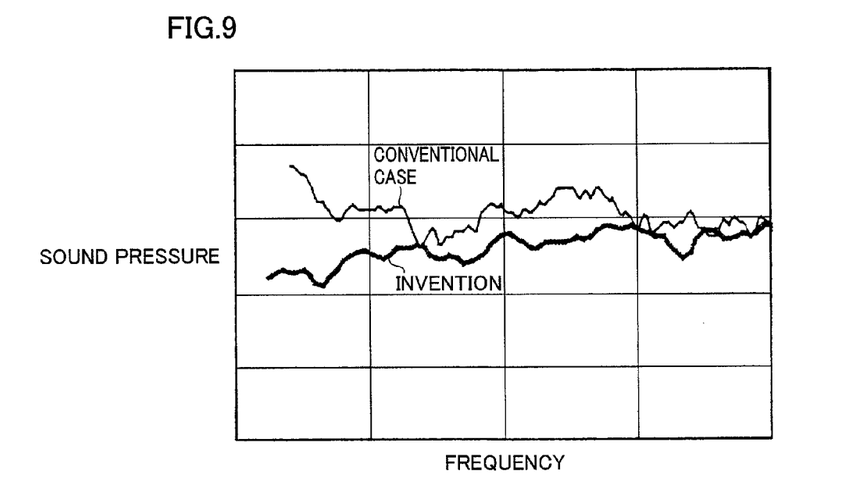
FIG. 9 is a schematic diagram to describe the electromagnetic noise generated during the drive of the rotating electric machine of the present invention.

FIG. 9 is a schematic diagram to describe the electromagnetic noise generated during driving of rotating electric machine 100 of the present invention.

Referring to FIG. 9, the conventional rotating electric machine exhibited noticeable electromagnetic noise attributable to the sound pressure level being relatively high in the low frequency and high frequency range where the motor rotational speed is relatively low. This is due to the aforementioned electromagnetic excitation at engine order 24.

In contrast, rotating electric machine 100 of the present invention has the electromagnetic excitation at engine order 24 substantially suppressed to zero, so that increase in the sound pressure level at the low frequency range and middle frequency range is suppressed, leading to significant reduction in the electromagnetic noise.

Rotating electric machine 100 of the present invention provides the advantage of reducing iron loss. In detail, iron loss becomes larger as the magnetic flux density increases, and is one factor in reducing the motor efficiency. In the conventional rotating electric machine, the different-phase-intermediate tooth exhibited relatively more iron loss than the same-phase-intermediate tooth since the different-phase-intermediate tooth has relatively more number of flux linkages than the same-phase-intermediate tooth and a high flux density (=number of flux linkages/cross sectional area).

Rotating electric machine 100 of the present invention has the magnetic flux density adjusted to be substantially equal between the different-phase-intermediate tooth and same-phase-intermediate tooth by setting the number of flux linkages therebetween equal. Therefore, the iron loss generated at the different-phase-intermediate tooth is reduced to a level substantially equal to the iron loss of the same-phase-intermediate tooth. Accordingly, the iron loss generated at stator core 52 in entirety is reduced than in the conventional rotating electric machine. As a result, the motor efficiency is improved.

[Modification]

Figure 10:
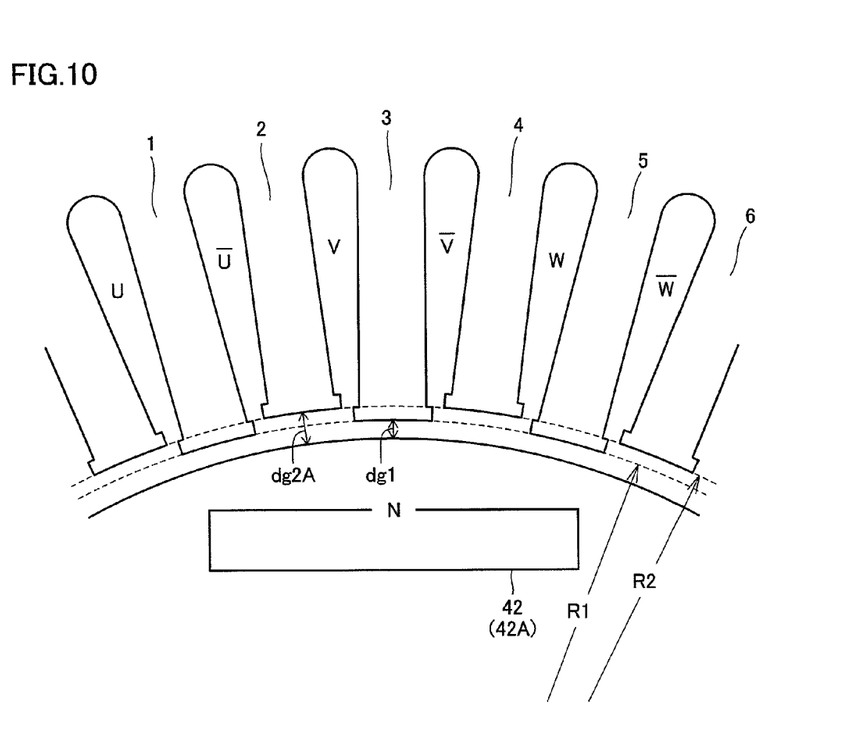
FIG. 10 is a diagram to describe the stator core of the rotating electric machine according to a modification of the first embodiment of the present invention.

FIG. 10 is a diagram to describe a stator core of a rotating electric machine according to a modification of the first embodiment of the present invention.

Referring to FIG. 10, stator core 52A has an air gap between the leading end of same-phase-intermediate tooth 1 (or 3, 5) and the outer circumferential face of rotor core 41 set such that the width (corresponding to arrow dg1 in the drawing) is substantially uniform in the circumferential direction. The leading ends of same-phase-intermediate teeth 1, 3 and 5 are located on the same circumference of a R1-radius circle about the rotational shaft of the rotating electric machine.

In addition, stator core 52 further has an air gap between the leading end of different-phase-intermediate tooth 2 (or 4, 6) and the outer circumferential face of rotor core 41 set such that the width (corresponding to arrow dg2A in the drawing) is substantially uniform in the circumferential direction. The leading ends of different-phase-intermediate tooth 2, 4 and 6 are located on the same circumference of a R2-radius (R2>R1) circle about the rotational shaft of the rotating electric machine.

In the present modification, different-phase-intermediate tooth 2 has an air gap of width dg2A set larger than width dg1 of the air gap of same-phase-intermediate teeth 1, 3 and 5. Accordingly, the magnetic resistance of the magnetic circuit formed by different-phase-intermediate teeth 2, 4 and 6 indicates a value higher than that of the magnetic resistance of the magnetic circuit of same-phase-intermediate teeth 1, 3 and 5. By setting air gap width dg2A such that the number of flux linkages of different-phase-intermediate tooth 2 is substantially identical to the number of flux linkages of same-phase-intermediate tooth 1, the excitation applied to different-phase-intermediate tooth 2 can be set substantially equal to the excitation applied to same-phase-intermediate tooth 1. By the canceling of electromagnetic excitation F1 and F2 applied in directions opposite to each other between same-phase-intermediate tooth 1 and different-phase-intermediate tooth 2, the electromagnetic excitation at engine order 24 applied to stator core 52 in entirety is set to substantially zero. As a result, vibration at stator core 52 is suppressed, allowing reduction in the electromagnetic noise of rotating electric machine 100.

According to the first embodiment of the present invention, the electromagnetic excitation of 6f applied to the stator core of the rotating electric machine can be set substantially to zero. As a result, stator core vibration can be suppressed, allowing reduction in the electromagnetic noise.

Second Embodiment

Figure 11:
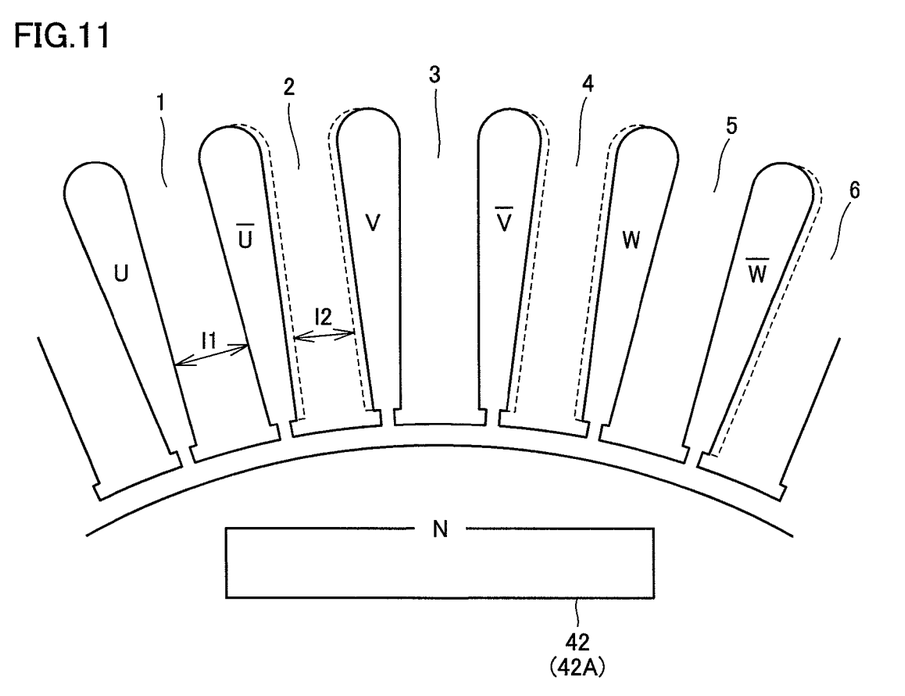
FIG. 11 is a diagram to describe a stator core of a rotating electric machine according to a second embodiment of the present invention.

FIG. 11 is a diagram to describe a stator core of a rotating electric machine according to a second embodiment of the present invention.

Referring to FIG. 11, stator core 52B is configured such that the tooth length in the circumferential direction differ between same-phase-intermediate tooth 1 (or 3, 5) and different-phase-intermediate tooth 2 (or 4, 6). Specifically, the teeth are formed such that the length of different-phase-intermediate tooth 2 in the circumferential direction (corresponding to 12 in the drawing) is larger than the length of same-phase-intermediate tooth 1 in the circumferential direction (corresponding to 11 in the drawing). Since the length of each tooth in the direction of the rotational shaft is equal, the cross sectional area of different-phase-intermediate tooth 2 is smaller than the cross sectional area of same-phase-intermediate tooth 1.

In view of the magnetic resistance of the teeth region being in inverse proportion to the cross sectional area of the tooth, the magnetic resistance of the tooth region of different-phase-intermediate tooth 2 becomes larger than the magnetic resistance of the tooth region of same-phase-intermediate tooth 1.

Accordingly, different-phase-intermediate tooth 2 has a magnetic circuit formed with a magnetic resistance higher than that of same-phase-intermediate tooth 1 due to the magnetic resistance at the tooth region being higher than that of same-phase-intermediate tooth 1.

At different-phase-intermediate tooth 2, the number of flux linkages passing through is reduced by the increased magnetic resistance. This reduction in magnetic flux will reduce the electromagnetic excitation applied to different-phase-intermediate tooth 2. By establishing a difference in the tooth length in the circumferential direction such that the number of flux linkages of different-phase-intermediate tooth 2 after reduction is substantially equal to the number of flux linkages of same-phase-intermediate tooth 1, the electromagnetic excitation applied to different-phase-intermediate tooth 2 and the electromagnetic excitation applied to same-phase-intermediate tooth 1 are substantially equal to each other. This causes canceling between the electromagnetic excitation applied in opposite directions therebetween, so that the electromagnetic excitation at engine order 24 applied to stator core 52 in entirety is set to substantially zero. As a result, vibration of stator core 52 is suppressed, allowing reduction in the electromagnetic noise of rotating electric machine 100.

According to the second embodiment of the present invention, the electromagnetic excitation of 6f applied to the stator core of the rotating electric machine can be set to substantially zero. As a result, stator core vibration can be suppressed, allowing reduction in the electromagnetic noise.

In the present embodiment, the configuration of differentiating the cross sectional area between the same-phase-intermediate tooth and different-phase-intermediate tooth is implemented by "magnetic resistance adjusting means".

It should be understood that the embodiments disclosed herein are illustrative and non-restrictive in every respect. The scope of the present invention is defined, not by the description set forth above, but by the appended claims, and all changes that fall within limits and bounds of the claims, or equivalence thereof are intended to be embraced by the claims.

INDUSTRIAL APPLICABILITY

The present invention can be applied to a rotating electric machine including a stator core having two slots formed per each pole and phase.

The invention claimed is:

1. A rotating electric machine of s (s is plural) phases, comprising:

a rotor including n (n is a natural number) magnetic poles, and a stator including a stator core having 2n×s teeth corresponding to two times said s phases for each of said n magnetic poles and 2n×s slots each formed between adjacent said teeth, and n×s coils wound around said 2n×s teeth, said n×s coils constituting a coil group wound in a manner shifted by just one slot per phase for each of said n magnetic poles, said 2n×s teeth including a same-phase-intermediate tooth having coils of a same phase inserted in two slots formed at both sides in a direction of a rotational shaft of said rotor, and a different-phase-intermediate tooth having coils of different phases inserted at two slots formed at both sides in the direction of the rotational shaft of said rotor, and said rotating electric machine having a difference established in magnetic resistance of a magnetic circuit formed at each of said same-phase-intermediate tooth and said different-phase-intermediate tooth when alternating current is supplied to said n×s coils such that the number of flux linkages passing through acquire balance with each other for said magnetic circuit.

2. The rotating electric machine according to claim 1, wherein said rotating electric machine has the magnetic resistance of the magnetic circuit formed at said different-phase-intermediate tooth set larger than the magnetic resistance of the magnetic circuit formed at said same-phase-intermediate tooth.

3. The rotating electric machine according to claim 2, wherein said rotating electric machine has a width of an air gap formed between a leading end of said different-phase-intermediate tooth and an outer circumferential face of said rotor set larger than the width of an air gap formed between the leading end of said same-phase-intermediate tooth and the outer circumferential face of said rotor.

4. The rotating electric machine according to claim 3, wherein said rotating electric machine has the width of the air gap formed between the leading end of said different-phase-intermediate tooth and the outer circumferential face of said rotor and the width of the air gap formed between the leading end of said same-phase-intermediate tooth and the outer circumferential face of said rotor set continuous at end portions of an opening of said slot.

5. The rotating electric machine according to claim 2, wherein said rotating electric machine has a magnetic path cross sectional area of said different-phase-intermediate tooth set smaller than the magnetic path cross sectional area of said same-phase-intermediate tooth.

6. A rotating electric machine of s (s is plural) phases, comprising:
a rotor including n (n is a natural number) magnetic poles, and
a stator including a stator core having 2n×s teeth corresponding to two times said s phases for each of said n magnetic poles and 2n×s slots each formed between adjacent said teeth, and n×s coils wound around said 2n×s teeth,
said n×s coils constituting a coil group wound in a manner shifted by just one slot per phase for each of said n magnetic poles,
said 2n×s teeth including a same-phase-intermediate tooth having coils of a same phase inserted in two slots formed at both sides in a direction of a rotational shaft of said rotor, and a different-phase-intermediate tooth having coils of different phases inserted at two slots formed at both sides in the direction of the rotational shaft of said rotor, and
said rotating electric machine further comprising magnetic resistance adjusting means for establishing a difference in magnetic resistance of a magnetic circuit formed at each of said same-phase-intermediate tooth and said different-phase-intermediate tooth when alternating current is supplied to said n×s coils such that the number of flux linkages passing through acquire balance with each other for said magnetic circuit.

7. The rotating electric machine according to claim 6, wherein said magnetic resistance adjusting means includes setting the magnetic resistance of the magnetic circuit formed at said different-phase-intermediate tooth larger than the magnetic resistance of the magnetic circuit formed at said same-phase-intermediate tooth.

8. The rotating electric machine according to claim 7, wherein said magnetic resistance adjusting means includes setting a width of an air gap formed between a leading end of said different-phase-intermediate tooth and an outer circumferential face of said rotor larger than the width of an air gap formed between the leading end of said same-phase-intermediate tooth and the outer circumferential face of said rotor.

9. The rotating electric machine according to claim 8, wherein said magnetic resistance adjusting means includes setting the width of the air gap formed between the leading end of said same-phase-intermediate tooth and the outer circumferential face of said rotor and the width of the air gap formed between the leading end of said different-phase-intermediate tooth and the outer circumferential face of said rotor continuous at end portions of an opening of said slot.

10. The rotating electric machine according to claim 7, wherein said magnetic resistance adjusting means includes setting a magnetic path cross sectional area of said different-phase-intermediate tooth smaller than the magnetic path cross sectional area of said same-phase-intermediate tooth.

11. The rotating electric machine according to claim 3, wherein said different-phase-intermediate tooth has an arc-like recess formed at the leading end, substantially at a center region of the leading end, to be concave outwardly in a radial direction, and excluding either end region in a circumferential direction.

12. The rotating electric machine according to claim 8, wherein said different-phase-intermediate tooth has an arc-like recess formed at the leading end, substantially at a center region of the leading end, to be concave outwardly in a radial direction, and excluding either end region in a circumferential direction.

* * * * *